United States Patent [19]

Leicht

[11] Patent Number: 5,188,573
[45] Date of Patent: Feb. 23, 1993

[54] PULLEY CONSTRUCTION

[75] Inventor: Jeffrey K. Leicht, Sheboygan, Wis.

[73] Assignee: Eclipse Manufacturing Co., Sheboygan, Wis.

[21] Appl. No.: 818,062

[22] Filed: Jan. 8, 1992

[51] Int. Cl.5 ............................................. F16H 55/36
[52] U.S. Cl. ....................................... 474/175; 474/183
[58] Field of Search ........................... 474/174–176, 474/179–181, 902, 183

[56] References Cited

U.S. PATENT DOCUMENTS

| 355,555 | 1/1887 | Radford. | |
|---|---|---|---|
| 2,139,622 | 12/1938 | Lonskey. | |
| 2,200,245 | 5/1940 | Schultz, Jr.. | |
| 3,105,709 | 10/1963 | Hanke. | |
| 3,190,134 | 6/1965 | Sadler et al. | 474/181 |
| 3,286,539 | 11/1966 | Loper et al. | 474/902 X |
| 3,961,406 | 6/1976 | Frost et al. | 29/159 R |
| 4,037,486 | 7/1977 | Schultz, Jr. | 29/159 R X |

Primary Examiner—Thuy M. Bui
Assistant Examiner—Roger J. Schoeppel
Attorney, Agent, or Firm—Andrus, Sceales, Starke & Sawall

[57] ABSTRACT

A pulley is constructed from a pair of identical pulley halves, each having a central opening with a series of notches extending therefrom. A hub member extends through the pulley half openings, and outwardly deformed rings are formed in a side wall of the hub member to sandwich portions of the pulley halves thererbetween adjacent the openings in the pulley halves. The rings are formed in a bulging process. The rings deflect inwardly into the notches, to prevent the pulley halves from rotating relative to each other when the pulley halves are assembled together.

9 Claims, 2 Drawing Sheets

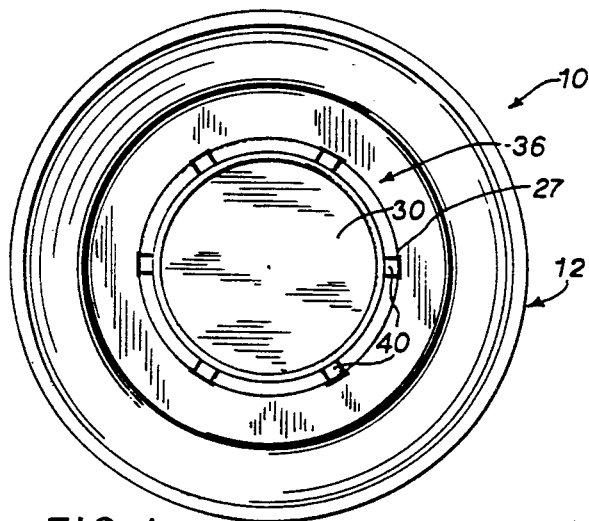
FIG.1
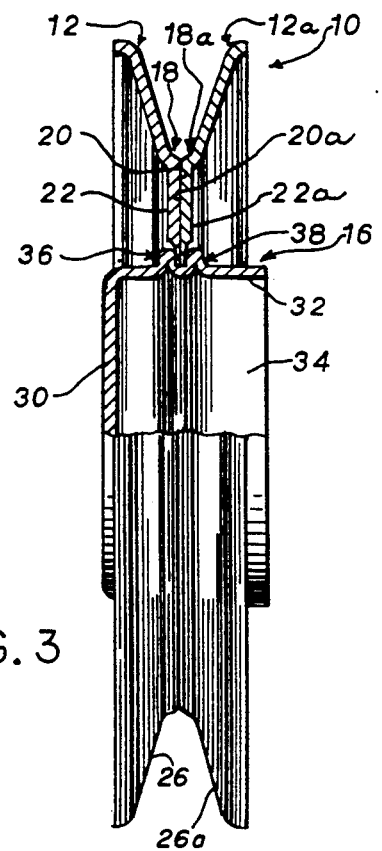
FIG.3
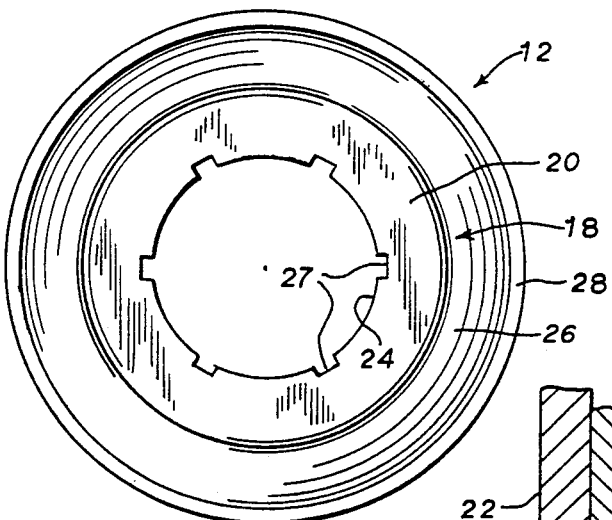
FIG.2
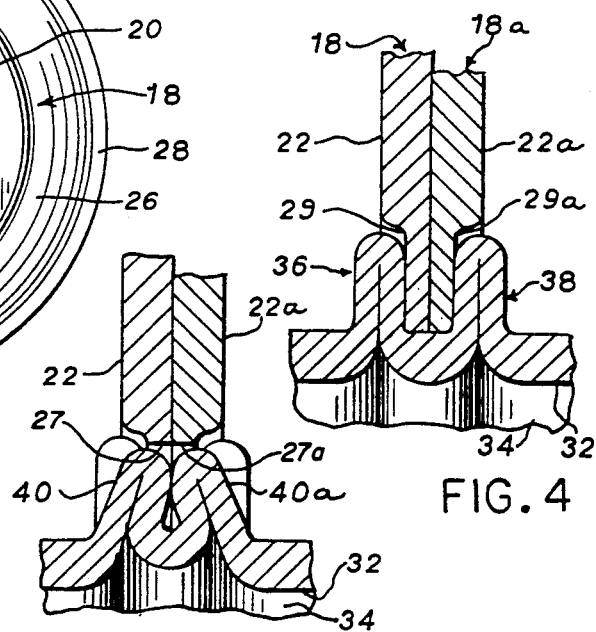
FIG.4
FIG.5

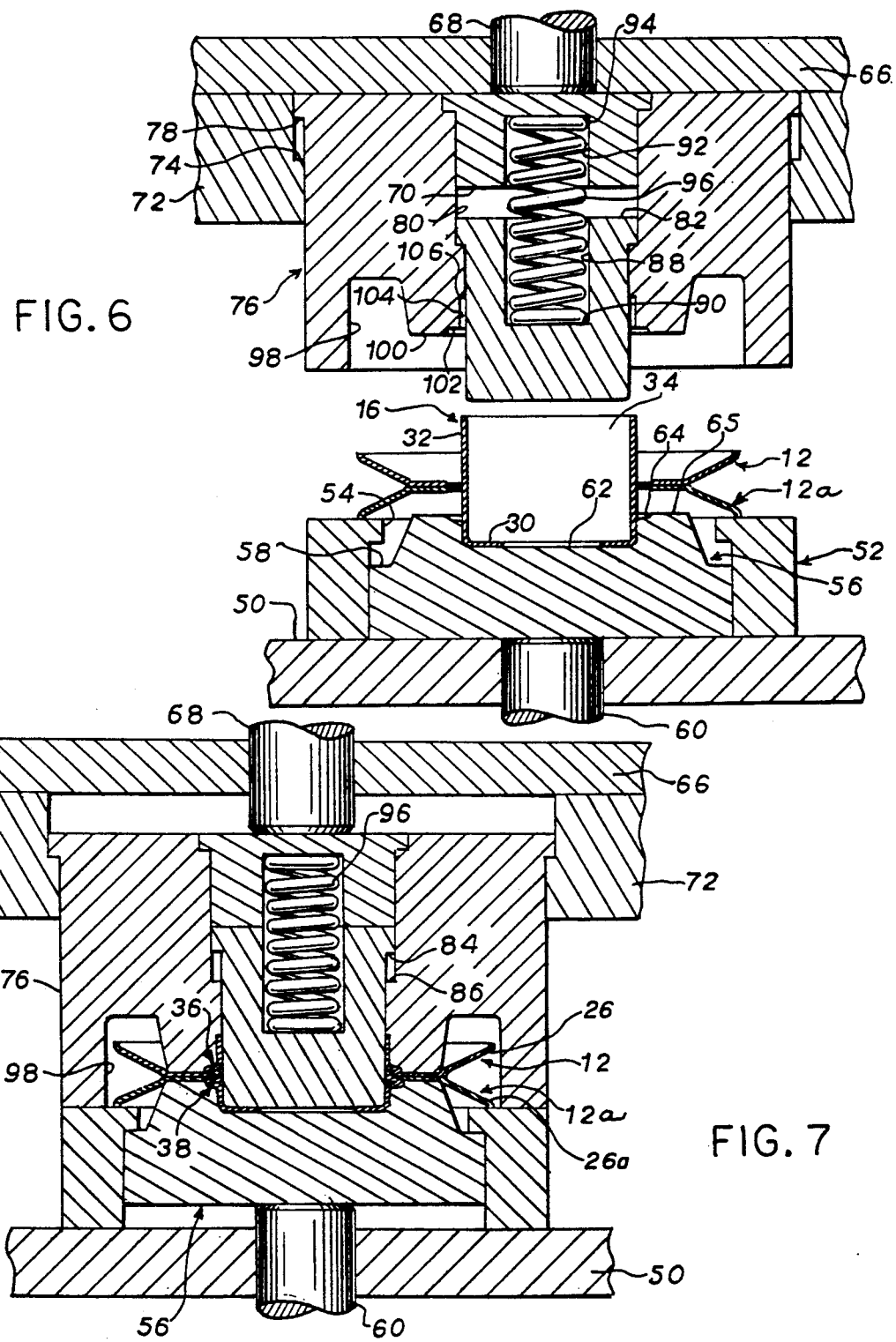

PULLEY CONSTRUCTION

BACKGROUND AND SUMMARY

This invention pertains to a pulley construction, and more particularly to an arrangement for connecting two facing pulley halves together.

It is known to form a pulley by stamping a pair of identical pulley halves, each having a hub portion, positioning the pulley halves such that the hub portions abut and face each other, and riveting the hub portions together. The pulley halves each include a flared outer peripheral portion so that, when the halves are riveted together, a V-shaped groove is defined about the periphery of the pulley assembly.

Another known method of forming a pulley is by employing a spinning operation, in which a blank is spun into a one-piece pulley.

It is an object of the present invention to provide a pulley constructed of a pair of identical pulley halves secured together through a unique arrangement which prevents the pulley halves from slipping relative to each other after assembly. It is a further object of the invention to provide a pulley construction in which a hub member provides the means by which the pulley halves are secured together. It is yet another object of the invention to provide a pulley construction which is simple in its components and in its assembly, yet which provides highly satisfactory performance.

In accordance with one aspect of the invention, a pulley is made up of a pair of disk-shaped pulley halves, which will be referred to as disks, each of which includes an inner hub portion having an opening therethrough. The disks are adapted to face each other such that the hub portions of each disk are in an abutting relationship with each other. When so positioned, the openings provided in the hub portions are aligned. A hub member is adapted to be inserted through the aligned openings in the disks. The hub member includes one or more annular side walls, which are preferably located in close proximity to the edges of the openings provided in the hub portions of the disks. An area of the hub member side wall located on either side of the opposite outwardly facing surfaces of the disks is deformed outwardly. The outwardly deformed portions of the hub member side wall are in contact with the opposite outwardly facing surfaces of the disk hub portions, whereby the disk hub portions are sandwiched between the outwardly deformed portions of the hub member side wall. With this arrangement, the disks are securely connected together. The invention further provides an arrangement for preventing slippage between the disks when they are secured together. In accordance with this aspect of the invention, one or more notches are formed in the hub portion of each disk, with the notches extending outwardly from the opening formed in the disk hub portion. In a preferred form, a series of notches are formed in the disk hub portion, with the notches being evenly spaced about the periphery of the opening. When the disks are abutted together, the notches in the disk hub portions are aligned with each other. The outwardly deformed portions of the hub member side wall are deformed into the aligned notches. That is, the outwardly deformed portions of the hub member side wall located over the notches are bent inwardly to partially fill the space defined by the notches, making positive contact with the edges of the notches. This acts to prevent the disks from rotating relative to each other after the pulley halves are secured together by the hub member.

The invention further contemplates a method of constructing a pulley from a pair of pulley halves or disks, substantially in accordance with the foregoing summary.

The invention still further contemplates a method of joining a pair of parts, each of which has an opening formed therethrough, substantially in accordance with the foregoing summary.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a side elevation view of a pulley constructed in accordance with the invention;

FIG. 2 is a side elevation view of one of the pulley halves or disks from which the pulley of FIG. 1 is constructed;

FIG. 3 is an end elevation view, partially in section, showing the pulley of FIG. 1;

FIG. 4 is an enlarged partial section view showing the outwardly deformed hub member side walls engaging the hub portions of the disks at the edges of the openings formed in the hub portions of each disk;

FIG. 5 is a view similar to FIG. 4, showing the outwardly deformed hub member side walls engaged within the notches provided in the disk hub portions at the openings;

FIG. 6 is a sectional view showing representative tooling for forming the pulley of FIGS. 1 and 2 from the facing aligned disks and the hub member, with the tooling in its open or retracted position; and FIG. 7 is a view similar to FIG. 6, showing the tooling in its closed position.

DETAILED DESCRIPTION OF THE INVENTION

FIGS. 1 and 3 illustrate a pulley assembly, shown generally at 10, constructed according to the invention. Pulley assembly 10 generally consists of a pair of identical pulley halves or disks 12, 12a, and a connector member in the form of a hub member 16 for securing disks 12, 12a together.

Disks 12 and 12a are identical in construction, being stamped from a circular blank using a die and press arrangement.

Disk 12 will be described in detail with reference to FIG. 2, with the understanding that the illustration and description of disk 12 applies with equal force to disk 12a.

As shown in FIG. 2, disk 12 consists of a central hub portion 18 having an inner surface 20 and an outer surface 22 (FIG. 3). A circular opening 24 is formed in hub portion 18, extending between its inner surface 20 and outer surface 22. Apertures in the form of a series of six equally radially spaced notches 27, are formed in hub portion 18, extending outwardly from circular opening 24.

Disk 12 further includes an angled wall 26 located outwardly of hub portion 18, and a curved outer flange portion 28 defining the outermost periphery of pulley half 12.

As noted, disk 12a is identical in construction to disk 12. In the drawings, the same reference characters as set forth above with respect to disk 12 are employed to describe the construction of disk 12a, with the addition of the designation "a" to each reference character.

Disks 12, 12a are adapted to be positioned such that inner surfaces 20, 20a of the disk hub portions 18, 18a, respectively are in a face-to-face position and abut each other. When in this position, the openings, such as 24, formed in disk hub portions, 18, 18a are aligned. Further, the notches, such as 27, formed in the openings in hub portions 18, 18a are aligned with each other. As shown in FIG. 4, the wall of each of hub portions 18, 18a adjacent the opening therethrough, such as 24, is provided with a necked-down portion 29, 29a having a reduced thickness relative to the outer area of hub portions 18, 18a.

Hub member 16 is cup-shaped, defining an end wall 30 and a side wall 32 extending from end wall 30. Side wall 32 is circular in cross section, and cooperates with end wall 30 to define an internal cavity 34.

Hub member side wall 32 is provided with a pair of outwardly deformed circumferential rings, shown generally at 36, 38. Ring 36 engages outer surface 22 of hub portion 18 of disk 12, while ring 38 engages outer surface 22a of hub portion 18a of disk 12a. Rings 36, 38 are spaced from each other and receive the walls of hub members 18, 18a therebetween, engaging the hub portion outer surfaces 22, 22a at necked-down portions 29, 29a adjacent the edges of the openings, such as 24, formed in hub portions 18, 18a.

FIG. 4 illustrates in detail the engagement of rings 36, 38 with necked-down portions 29, 29a of hub portions 18, 18a. As shown, the height of rings 36, 38 is less than that of necked-down portions 29, 29a of hub portions 18, 18a. The portion of hub member side wall 32 disposed between rings 36, 38 conforms to the contour of the hub member walls facing into and located adjacent the openings, such as 24, formed in the hub members. As shown in FIG. 4, side wall 32 between rings 36, 38 defines a U-shape. As will be explained, rings 36, 38 are formed so as to exert a positive clamping force on necked-down portions 29, 29a to sandwich necked-down portions 29, 29a therebetween.

Referring to FIG. 5, rings 36, 38 are formed so as to deflect inwardly at the notches, such as 27, formed in the hub portions 18, 18a of disks 12, 12a. Such inward deflection of rings 36, 38 define keys, shown at 40, 40a, which hub the edges of the notches, such as 27, to interlock hub member 16 with disks 12, 12a. The engagement of the keys 40, 40a with the notches, such as 27, prevents relative rotation between disks 12, 12a when they are secured together by hub member 16.

Rings 36, 38, which extend outwardly from the outer surface of hub member side wall 32, are formed by a process known as "bulging", a technique known in the field of metal forming. FIGS. 6 and 7 schematically illustrate tooling used to form pulley 10 by deforming hub member side wall 32 to its configuration as shown in FIGS. 3–5. It should be understood that the illustration of the tooling in FIGS. 6 and 7 is a schematic representation of one of many possible ways to deform hub member side wall 32 to its final desired configuration, and that other satisfactory tooling arrangements can be employed.

Referring to FIG. 6, a stationary pad 50 is provided on the bed of a forming apparatus. A retaining ring 52 is fixedly mounted to pad 50. The upper surface of retaining ring 52 serves to support the stamped disks 12, 12a prior to their being assembled together. Retaining ring 52 further includes an inwardly extending lip 54.

A lower die 56 is located inside retaining ring 52, and includes a shoulder 58. Die 56 is mounted to the end of a rod 60 associated with a hydraulically operated piston for moving die 56 in an up and down direction within ring 52, in a manner as is known. Die 56 further includes an upwardly facing recess 62 formed in its upper surface, adapted to receive the end of the cup-shaped hub 16 prior to its being deformed. An annular recess 64 extends outwardly from the side walls of recess 62 at the upper surface 65 of lower die 56.

An upper platen 66 is mounted to the upper ram face of the forming apparatus. As is known, platen 66 is movable in an upward and downward direction, so as to provide movement of the tool between its open and closed positions. A hydraulically actuable rod 68 extends through platen 66, and a spacer 70 is mounted to the end of rod 68. A retaining ring 72 is mounted to the underside of upper platen 66, and includes an inwardly extending lip 74. An upper die 76 is movably mounted within retaining ring 72, and includes a shoulder 78.

Upper die 76 further includes a passage 80 disposed below spacer 70, within which a pilot 82 is movably mounted. Referring to FIG. 7, pilot 82 includes a shoulder 84 and upper die 76 includes a lip 86 extending inwardly into the passage extending therethrough. Pilot 82 defines a passage 88 terminating in an end surface 90, and spacer 70 defines a passage 92 terminating in an end surface 94. A spring 96 extends through pilot passage 88 and spacer passage 92, engaging end surfaces 90, 94, respectively, to bias pilot 82 away from spacer 70, as shown in FIG. 6. In this position, shoulder 84 of pilot 82 and lip 86 defined by die 76 are engaged with each other, as shown in FIG. 6.

Upper die 76 further includes an annular cavity 98 extending upwardly from its lower downwardly facing surface, and a shoulder 100. An annular recess 102 extends upwardly from shoulder 100, leading into a space 104 which terminates in a downwardly facing shoulder 106.

Recess 64 in lower die 56 and recess 102 in upper die 76 include facing, registered lands which are in locations, corresponding to the locations of the notches, such as 27, formed in hub portions 18, 18a of disks 12, 12a. Disks 12, 12a are placed on the upper surface of retaining ring 52 such that the notches, such as 27, are in register with the locations of the lands provided in recesses 64, 102, in a manner as is apparent to one skilled in the art.

In operation, after disks 12, 12a and hub member 16 are placed between lower die 56 and upper die 76, as shown in FIG. 6, the ram to which upper die 76 is mounted is moved downwardly to move upper die 76 to its closed position, as shown in FIG. 7, and rods 60, 68 are hydraulically actuated so as to extend to their positions as shown in FIG. 7. In this position, angled outer portions 26, 26a of disks 12, 12a are received within annular cavity 98 formed in upper die 76. Upper shoulder 65 of lower die 56 engages outer surface 22a of disk 12a, while shoulder 100 of upper die 76 engages outer surface 22 of disk 12. Upon downward movement of upper die 76, pilot 82 is received within passage 34 of hub member 16, with its lower end engaging end wall 30 of hub member 16. Pilot 82 thus provides internal support to hub member 16. Upon extension of rod 68 to move upper die 76 downwardly, the upper portion of hub member side wall 32 is received within passage 104 defined by upper die 76 until it engages end 106 of passage 104. Once this occurs, rods 60 and 68 are simultaneously moved toward each other, which results in the bulging deformation of hub member side wall 32 outwardly to form rings 36 and 38, as shown in FIG. 7. The lands associated with recesses 64 and 102 act to deform rings 36 and into the notches, such as 27, associated with hub portions 18, 18a of disks 12, 12a during such movement of lower die 56 and upper die 76 together, to "stake" hub member 16 to disks 12 and 12a, described previously.

After hub member 16 has been deformed in the manner as illustrated in FIGS. 6 and 7, rods 60 and 68 are retracted and upper platen 66 moved upwardly to its FIG. 6 position, to allow the completed pulley assembly 10 to be removed from between lower die 56 and upper die 76, so that the above-described process can be repeated.

The method of constructing a pulley as shown and described provides a pulley which is simple in construction, utilizing a minimal number of steps in its assembly. The pulley halves are firmly and securely connected together, and the pulley halves cannot rotate relative to each other during operation, due to the pulley halves being staked together by the integrally formed keys in the rings of the hub member extending into the notches in the pulley halves.

Various alternatives and embodiments of carrying out the present invention are contemplated as being within the scope of the following claims particularly pointing out and distinctly claiming the subject matter which is regarded as the invention.

I claim:

1. A pulley, comprising:
   a first pulley half having a hub portion defining an inner surface and an outer surface and having an opening extending therethrough;
   a second pulley half having a hub portion defining an inner surface and an outer surface and having an opening extending therethrough;
   wherein the first and second pulley halves face each other such that the hub portion inner surfaces abut each other and the hub portion openings are aligned;
   a hub member extending through the hub portion openings and having one or more peripheral side walls, wherein portions of the side walls are deformed outwardly to engage the outer surface of the hub portion of each pulley half adjacent the opening therethrough to sandwich the hub portions of the pulley halves therebetween to secure the pulley halves together; and
   an interlocking arrangement provided on the hub member and the pulley halves for preventing relative rotational movement between the pulley halves when the pulley haves are secured together by the hub member, wherein the interlocking arrangement comprises one or more apertures formed in each pulley half hub portion, and wherein the outwardly deformed portions of the hub member side wall are disposed within the one or more apertures to interlock the hub member and the pulley halves.

2. The pulley of claim 1, wherein the one or more side walls of the hub member are deformed outwardly adjacent the outer surface of the pulley half hub portions throughout the entire periphery of the hub member side wall, to form a pair of continuous spaced rings extending outwardly from the hub member side wall, with the hub portions of the pulley halves being disposed between and engaged by the pair of rings.

3. The pulley of claim 1, wherein the one or more apertures in the hub portions are aligned with each other.

4. The pulley of claim 1, wherein the one or more apertures comprise a series of notches formed in each pulley half hub portion, with the notches opening onto and extending outwardly from the opening formed in each pulley half hub portion.

5. A method of constructing a pulley, comprising the steps of:
   providing a pair of pulley halves, each having a hub portion defining an inner surface and an outer surface and having an opening extending therethrough;
   positioning the pulley halves such that the inner surfaces of the hub portions abut each other and the openings are aligned;
   placing a hub member through the openings in the hub portion of each pulley half, the hub member having one or more side walls;
   deforming portions of the hub member one or more side walls outwardly adjacent the outer surface of each pulley half hub portion, to engage the outer surface of the hub member of each pulley half adjacent the opening therethrough to sandwich portions of the hub members therebetween to secure the pulley halves together; and
   interlocking the hub member with the pair of pulley halves to prevent relative rotational movement between the pulley halves when the pulley halves are secured together by the hub member, by forming one or more apertures in each pulley half hub portion, and deflecting the outwardly deformed portions of the hub member side wall into the one or more apertures, to interlock the hub member and the pulley halves.

6. The method of claim 5, wherein the step of deforming portions of the hub member one or more side walls outwardly comprises deforming the hub member side walls outwardly throughout the periphery of the side walls, to form a pair of continuous spaced rings, with the hub portions of the pulley halves being disposed between and engaged by the rings.

7. The method of claim 5, wherein the step of forming one or more apertures in each pulley half comprises forming a series of notches in each pulley half hub portion, with the notches being formed so as to open onto and extend outwardly from the opening formed in each pulley half hub portion.

8. A pulley, comprising:
   a first pulley half having a hub portion defining an inner surface and an outer surface and having an opening extending therethrough;
   a second pulley half having a hub portion defining an inner surface and an outer surface and having an opening extending therethrough;
   wherein each pulley half includes one or more apertures; and
   a hub member for connecting the first and second pulley halves together;
   wherein the pulley is constructed by positioning the pulley halves such that the inner surfaces of the hub portions abut each other and the openings are aligned;

placing the hub member through the openings in the hub portion of each pulley half; and deforming portions of the hub member one or more side walls outwardly adjacent the outer surface of each pulley half hub portion, to engage the outer surface of the hub portion of each pulley half adjacent the opening therethrough, to sandwich portions of the hub members therebetween to secure the pulley halves together; and deflecting the outwardly deformed portions of the hub member one or more side walls into the one or more apertures of each pulley half, to interlock the hub member and the pulley halves for preventing relative rotational movement between the pulley halves and the hub member when the pulley halves are secured together by the hub member.

9. A pulley, comprising:

a first pulley half having a hub portion defining an inner surface and an outer surface and having an opening extending therethrough, and further including one or more recessed areas extending inwardly from the hub portion outer surface;

a second pulley half having a hub portion defining an inner surface and an outer surface and having an opening extending therethrough, and further including one or more recessed areas extending inwardly from the hub portion outer surface;

wherein the first and second pulley halves face each other such that the hub portion inner surfaces abut each other and the hub portion openings are aligned;

a hub member extending through the hub portion openings and having one or more peripheral side walls, wherein portions of the side walls are deformed outwardly to engage the outer surface of the hub portion of each pulley half adjacent the opening therethrough to sandwich the hub portions of the pulley halves therebetween to secure the pulley halves together; and an interlocking arrangement provided on the hub member and the pulley halves for preventing relative rotational movement between the pulley halves and the hub member when the pulley halves are secured together by the hub member, wherein the interlocking arrangement comprises the outwardly deformed portions of the hub member side walls disposed within the one or more recessed areas of the first and second pulley half hub portions, to interlock the hub member with the pulley halves.

* * * * *